(12) United States Patent
Kapoor

(10) Patent No.: US 8,935,214 B2
(45) Date of Patent: Jan. 13, 2015

(54) STORING ELECTRONIC CONTENT WITH TIME-VARYING PROPERTIES

(75) Inventor: Rahul Kapoor, Mountain View, CA (US)

(73) Assignee: Mimosa Systems, Inc., San Francisco, CA (US)

( * ) Notice: Subject to any disclaimer, the term of this patent is extended or adjusted under 35 U.S.C. 154(b) by 636 days.

(21) Appl. No.: 12/856,904

(22) Filed: Aug. 16, 2010

(65) Prior Publication Data
US 2012/0041929 A1 Feb. 16, 2012

(51) Int. Cl.
*G06F 17/30* (2006.01)

(52) U.S. Cl.
CPC .... *G06F 17/30014* (2013.01); *G06F 17/30073* (2013.01)
USPC .......................................................... 707/668

(58) Field of Classification Search
CPC ....................... G06F 11/1453; G06F 17/30073
USPC .......................................... 707/686, 668, 692
See application file for complete search history.

(56) References Cited

U.S. PATENT DOCUMENTS

| | | | | |
|---|---|---|---|---|
| 7,702,618 | B1 * | 4/2010 | Patterson ............... | 707/999.003 |
| 2002/0138467 | A1 * | 9/2002 | Jacobson et al. ................... | 707/1 |
| 2004/0083263 | A1 * | 4/2004 | Richardson et al. .......... | 709/204 |
| 2006/0004877 | A1 * | 1/2006 | Ishikawa et al. .............. | 707/200 |
| 2006/0184589 | A1 * | 8/2006 | Lees et al. ...................... | 707/201 |
| 2007/0016887 | A1 * | 1/2007 | Kaler et al. .................... | 717/101 |
| 2008/0034373 | A1 * | 2/2008 | Glynn et al. ................... | 719/312 |
| 2008/0256138 | A1 | 10/2008 | Sim-Tang | |
| 2009/0138869 | A1 * | 5/2009 | Fitzgerald et al. ............ | 717/172 |
| 2010/0106687 | A1 | 4/2010 | Marcy et al. | |
| 2010/0293475 | A1 * | 11/2010 | Nottingham et al. ......... | 715/752 |
| 2011/0302195 | A1 * | 12/2011 | Cai et al. ....................... | 707/769 |

OTHER PUBLICATIONS

Bob Spurzem, "Mimosa NearPoint for Microsoft Exchange Server", Jun. 2007, Mimosa Systems, 20 pages.*
Bob Spurzem, "New Strategies for Discovery of Email", Jul. 2008, Mimosa Systems, 18 pages.*
International Searching Authority, International Search Report and the Written Opinion, Jan. 5, 2012, 8 Pages.

* cited by examiner

*Primary Examiner* — Rehana Perveen
*Assistant Examiner* — Scott A Waldron

(57) ABSTRACT

Systems and methods for controlling document storage and tracking model dynamic attributes of a document in a time-varying manner, and enable reconstruction of a document's state at any point in time. The time-varying model identifies dynamic components of documents, where dynamic components include time-varying properties that changes over time. A set of validity parameters are associated with each state of a document (the state of a document corresponds to a new version of the document that results from changes to the document), and the set of validity parameters define a validity period for the state. Instead of archiving each new version of the document that corresponds to each new state of the document, the document is archived in storage by archiving information of the states along with the set of validity parameters corresponding to each state.

40 Claims, 5 Drawing Sheets

STORING ELECTRONIC CONTENT WITH TIME-VARYING PROPERTIES

TECHNICAL FIELD

Embodiments are described relating to systems and methods for storing electronic content and, more particularly, efficiently storing electronic content with time-varying properties.

BACKGROUND

Conventional systems and methods for data tracking and storage track document versions over time (e.g., documents, distribution lists, etc.) by creating a new version record in the database for each revision made to the document. As a result, data storage requirements were significantly increased because every revision to a document resulted in a new version of the document, and all versions of the document had to be maintained in database storage.

This was especially problematic when dealing with electronic mail distribution lists because these lists were always changing. Each time a change was made to a list (e.g., member added, member deleted, etc.) a new version of the list was created such that all member records were duplicated per revision. Additional storage was required because nested lists were flattened for every stored version of the list. Furthermore, for messages including lists as recipients, all lists were recursively expanded for efficient searching of indirect recipients of a message. As a result excessive amounts of database storage were used to archive this data.

Moreover, conventional data tracking and storage also lacked storage efficient methods for tracking other time-varying properties of a document (e.g., flag states, document states, etc.) because, again, every change in a time-varying property results in a new version of the document or record. To save on storage, only the last value of such dynamic attributes of a document might be retained, and this was not a viable solution for tracking document properties over the life of a document.

DETAILED DESCRIPTION

Systems and methods for controlling document storage and tracking model dynamic attributes of a document in a time-varying manner, and enable reconstruction of a document's state at any point in time. The time-varying model identifies dynamic components of documents, where dynamic components include time-varying properties that changes over time. A set of validity parameters are associated with each state of a document (the state of a document corresponds to a new version of the document that results from changes to the document), and the set of validity parameters define a validity period for the state. Instead of archiving each new version of the document that corresponds to each new state of the document, the document is archived in storage by archiving information of the states along with the set of validity parameters corresponding to each state.

Figure 1:
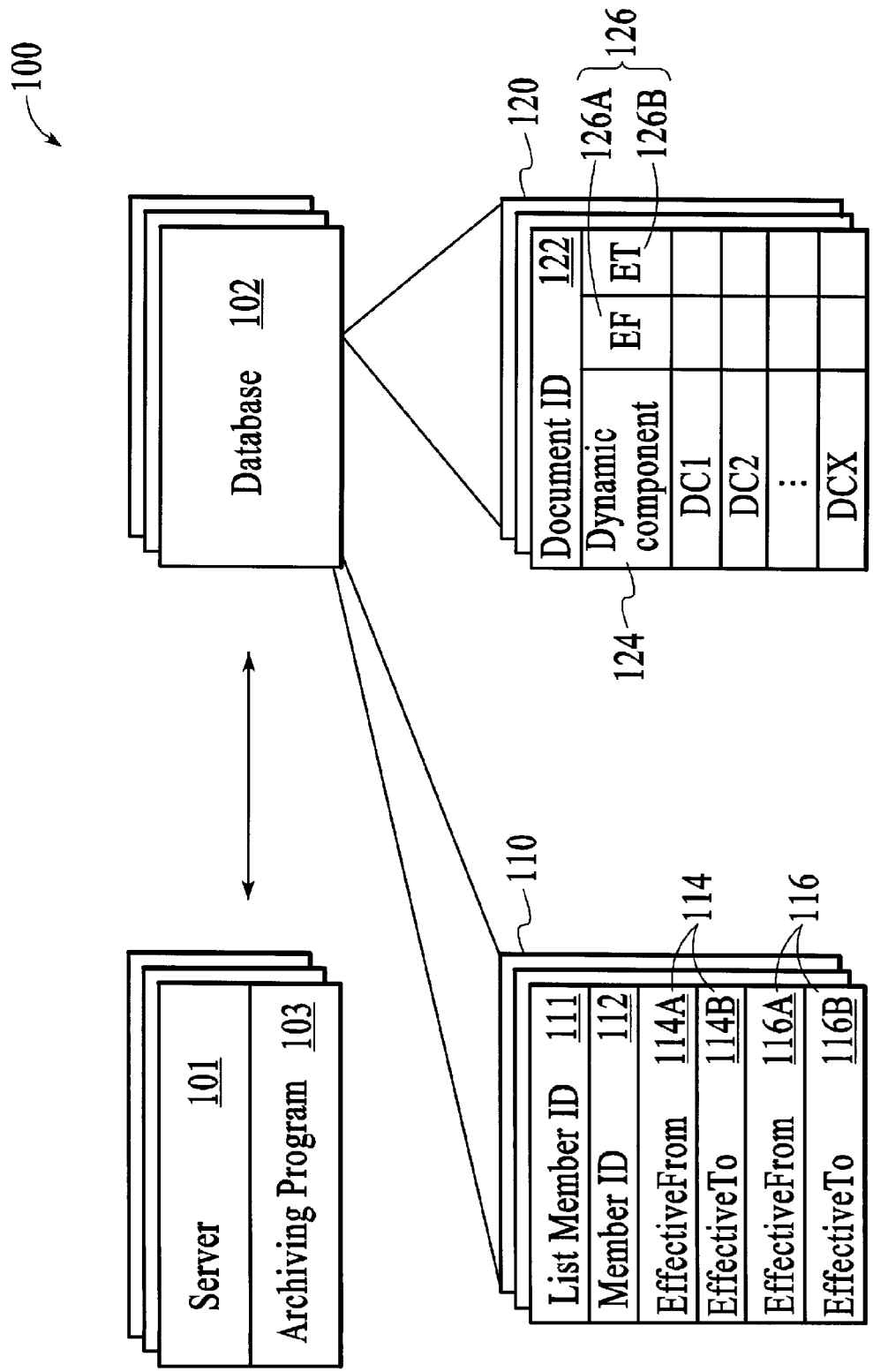
FIG. 1 is a block diagram of a system for data tracking and storage, under an embodiment.

FIG. 1 is a block diagram of a system for data tracking and storage 100 (e.g., archiving), under an embodiment. The system 100 comprises a server 101 and/or other processor-based device coupled or connected to at least one database or archive 102. The database can be of any type/configuration, storing data in one or more different formats. The data comprising documents and other electronic content described herein are processed by an archiving program or application 103 running on the server 101 for storage or archiving in the database 102. When the document includes dynamic or time-varying components, the archiving program 103 described herein enables compact and efficient data storage and tracking by maintaining a record of changes to a received document along with an effective or validity period corresponding to each change. More particularly, the embodiments identify components of the document that change over time as the time-varying components, and then track and record the state of each time-varying component along with the validity period of each state. The record or tables of changes with corresponding validity periods 110/120 are tracked over the life of the document instead of archiving each new version of the document resulting when changes are made to the document.

Figure 2:
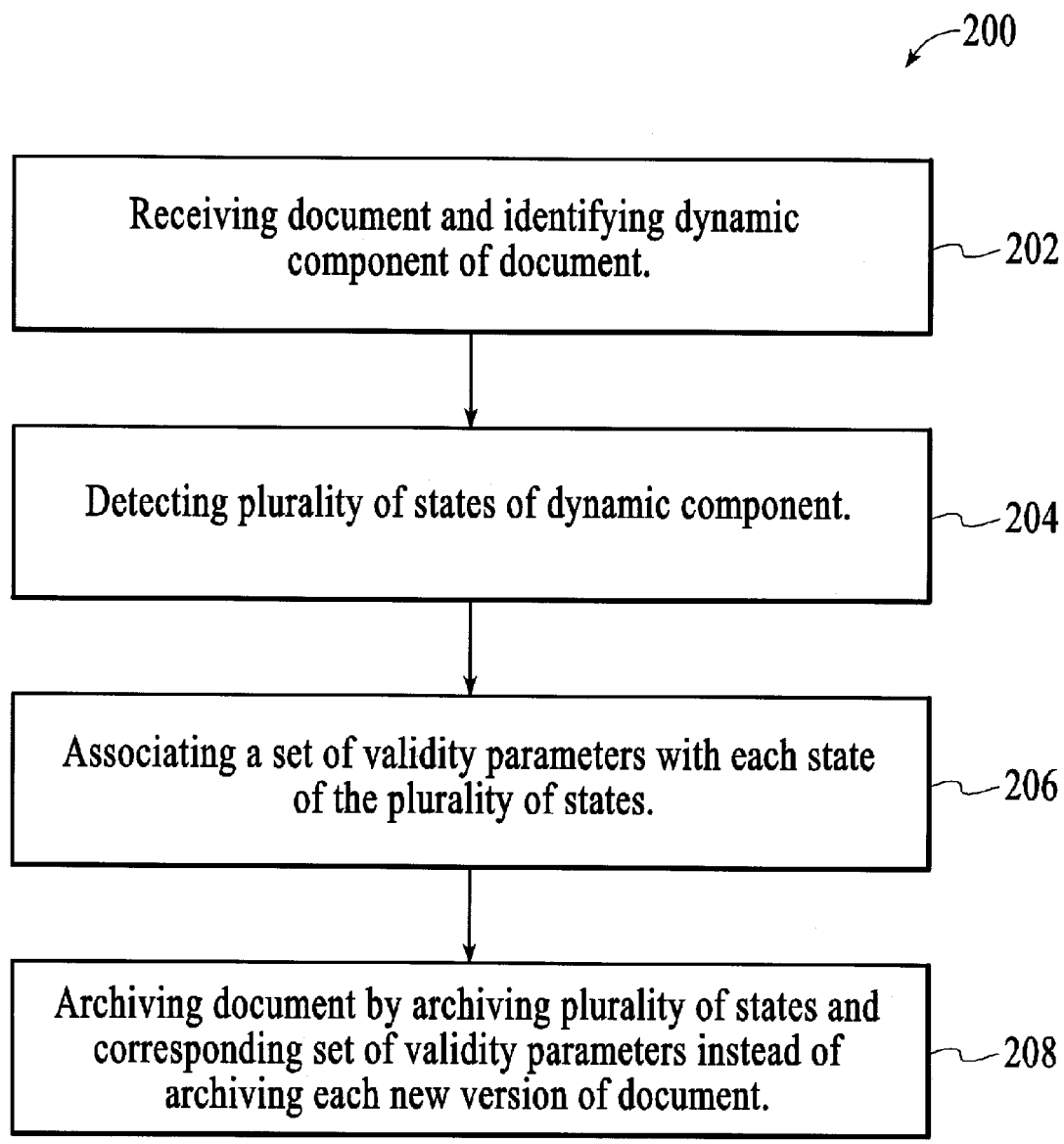
FIG. 2 is a flow diagram for storing documents having time-varying components, under an embodiment.

Generally, FIG. 2 is a flow diagram for storing documents having time-varying components 200, under an embodiment. The document storing operations comprise receiving a document and identifying a dynamic component of the document 202. The document comprises electronic content, and the dynamic component includes at least one time-varying property that changes over time. The states of the dynamic component are detected or identified 204, with each state corresponding to a new version of the document that results from subsequent changes to the document. The operations include associating a set of validity parameters with each state such that the set of validity parameters define a validity period for the state 206. The document is archived by archiving the states and the set of validity parameters corresponding to each state instead of archiving each new version of the document that corresponds to each state of the document.

Figure 3:
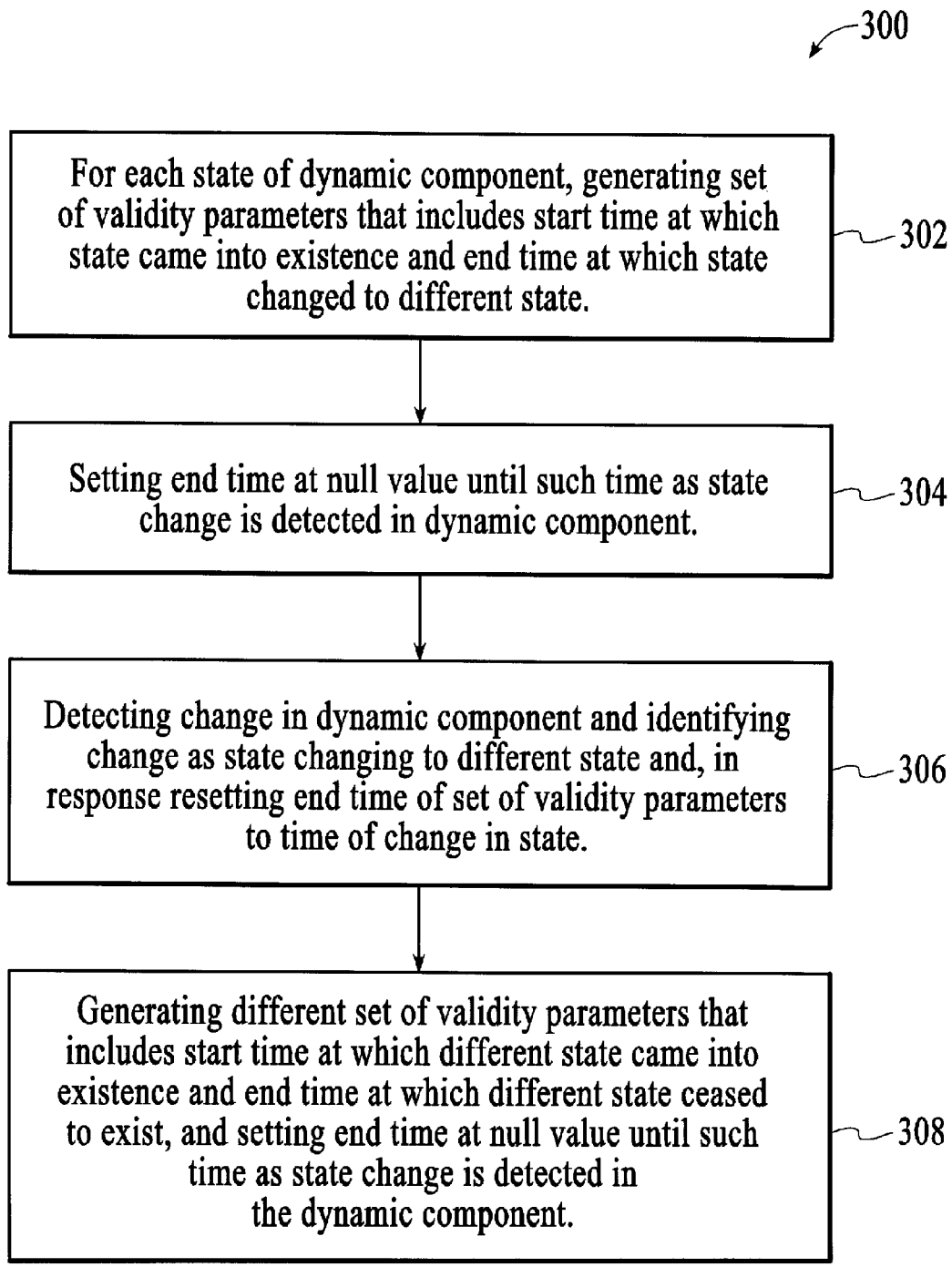
FIG. 3 is a flow diagram for generating validity parameters corresponding to states of the dynamic or time-varying components, under an embodiment.

FIG. 3 is a flow diagram for generating validity parameters corresponding to states of the dynamic or time-varying components 300, under an embodiment. Operations for generating validity parameters corresponding to states of the dynamic components include, for each state of the dynamic component, generating a set of validity parameters that includes a start time at which the state came into existence and an end time at which the state changed to a different state 302. The end time is set at a null value until such time as a state change is detected in the dynamic component 304, and the null value indicates the dynamic component is currently remaining in the state. When a change in the dynamic component is detected the change is identified as a state change to the different state, and the end time of the set of validity parameters is reset to a time of the state change 306. An embodiment generates a different set of validity parameters that includes a start time at which the different state came into existence and an end time at which the different state ceased to exist 308. The end time of the different set of validity parameters is set at a null value until such time as a state change is detected in the dynamic component. As described herein, the null value indicates the dynamic component is currently remaining in the different state. Examples follow of use of time-varying components in the storage and tracking of documents.

As an example, and with reference to FIG. 1, a received document includes a list comprising multiple members or elements. The list can include, for example, one or more of a list having membership changes over time, an electronic mail distribution list, a security access list, a user group list, and an access rights list, to name a few. A dynamic component of this document (list) as described herein is a period of time each member is on the list. As such, an embodiment generates and maintains a membership list record or table 110 that includes a list identification 111 for the list to which it corresponds and, for each member, a member identification 112 that identifies the member along with at least one set of validity parameters 114 that define at least one validity period for that member. The format of the list record 110 can be any format as appropriate to the data contents of the list record 110 and/or the structure of the corresponding database. Under this example, the validity period 114 includes the use of a set of validity parameters that include an "effective from" validity parameter 114A and an "effective to" validity parameter 114B to define a period of time during which the member was a member of the list. The "effective from" parameter 114A specifies the time of inclusion of the member on the list, and the "effective to" parameter 114B specifies the time of termination of membership on the list. The "effective from" validity parameter 114A is also referred to herein as the "start time" and the "effective to" validity parameter 114B is also referred to herein as the "end time." When the member is added to and removed from the list multiple times, the list membership record 110 for that member includes multiple sets 114/116 of validity parameters, with each set of validity parameters 114/116 specifying the validity period for each corresponding time spent as a member of the list.

Use of the storage and tracking solution of an embodiment eliminates the need to introduce an explicit list version on each change to the list and, instead, just tracks membership changes over time, with each member having a validity period (e.g., "effective from" and "effective to"). An embodiment uses a special value (null value) to indicate a member is currently active on the list. The storage and tracking of an embodiment also eliminates the need to expand nested distribution lists in place and does not expand distribution list members for every message sent to a distribution list. Instead, distribution lists are treated like any other list member or mail recipient.

Generating and maintaining a membership list record of an embodiment with validity parameters corresponding to each member or element of the list includes generating a first set of validity parameters that defines a first validity period corresponding to a first state of the element. When the document is received it includes the element in the first state. The first validity period includes a start time and an end time. The end time is set at a null value until such time as a change in state is detected, and the null value indicates the element is remaining in the first state.

When a change associated with the element is detected, the change is identified as a change in state from the first state to a second state. The change in state includes, but is not limited to, adding the element to the list, removing the element from the list, and/or revising the element on the list, to name a few. In response to the state change, the end time of the first validity parameter is reset to a time of the change in state. Further, an embodiment generates a second set of validity parameters that defines a second validity period corresponding to the second state. The second validity period includes a start time that is the time of the change in state. The end time of the second validity period is set to the null value until such time as a subsequent change in state is detected. The process of maintaining the membership list record in response to detected changes in the element repeats upon detection of all subsequent changes in state of the list.

Figure 4:
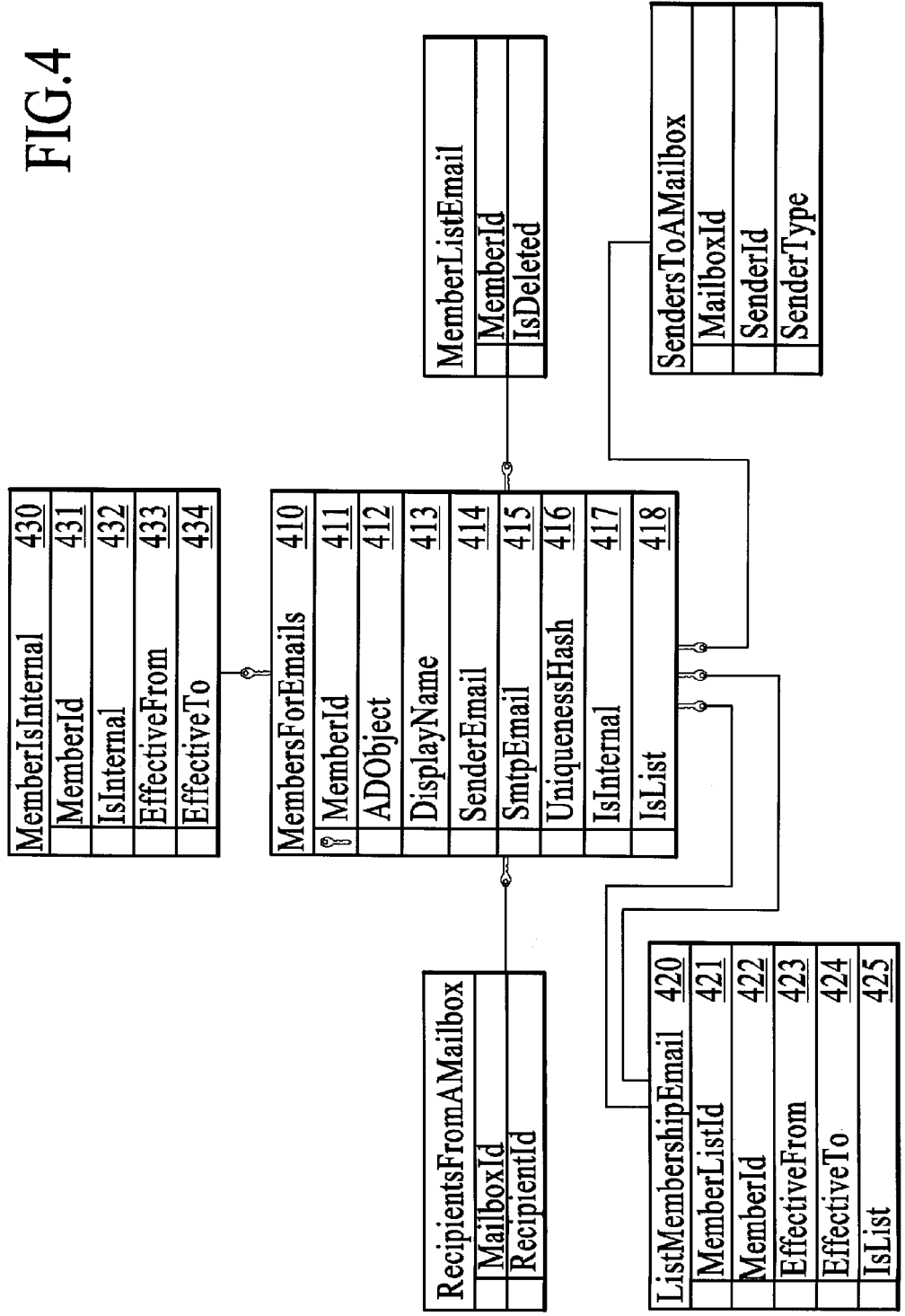
FIG. 4 shows an example database tree of tables for tracking electronic mail distribution list membership changes over time as a dynamic component, under an embodiment.

FIG. 4 shows an example database tree of tables for tracking electronic mail distribution list membership changes over time as a dynamic component, under an embodiment. In this example, the document or table "MembersForEmails" 410 includes information on all members along with attributes. This table 410 can be thought of as a directory that includes information on all members of a database that have an email account, where a member includes the likes of individuals, groups, lists of individuals, and/or lists of groups. Each member included in the table 410 corresponds to and is identified using a member identification 411 (e.g., "MemberID"). The table 410 also includes any number of attributes corresponding to a member (e.g., this example includes attribute fields "ADObject" 412 (links member to active directory information), "DisplayName" 413 (named used for display purposes), "SenderEmail" 414 (sender's email as known to active directory), "SmtpEmail" 415 (email address for SMTP protocol), "UniquenessHash" 416 (hash of {SenderEmail, SMTPEmail} of properties used for identifying a member), "IsInternal" 417 (identifies whether member is within or outside organization), and "IsList" 418 (identifies whether member is list or individual), but is not limited to these attributes).

The database includes a "ListMembershipEmail" table 420 that corresponds to each email distribution list in the database. The email distribution list to which a particular "ListMembershipEmail" table 420 corresponds is identified using the "MemberListID" field 421. The table 420 includes a record for each member included in the "MembersForEmails" table 410, to which it is linked, and the record identifies the member to which it corresponds using the "MemberID" field 422.

The dynamic component of this table 420 is a period of time each member is on the list. As such, the record for each member includes at least one set of validity parameters 423/424 that define at least one validity period for that member. Under this example, the validity period 423/424 includes the use of a set of validity parameters that include an "EffectiveFrom" parameter 423 and an "EffectiveTo" parameter 424 to define a period of time during which the member was a member of the list. The "EffectiveFrom" parameter 423 specifies the time of inclusion of the member on the list, and the "EffectiveTo" parameter 424 specifies the time of termination of membership on the list. When the member is added to and removed from the list multiple times, the list membership record for that member includes multiple sets of validity parameters (not shown), where each set of validity parameters specifies the validity period for each corresponding period spent as a member of the list. The table 420 also includes any number of attributes corresponding to a member (e.g., this example includes an attribute field "IsList" 425 (identifies whether member is list or individual), but is not limited to this attribute).

The database includes a "MemberIsInternal" table 430 that corresponds to each member in the database. The member to which a particular "MemberIsInternal" table 430 corresponds is identified using the "MemberID" field 431. The dynamic component of this table 430 is a period of time each member is internal to the organization. As such, the record for each member includes an attribute field "IsInternal" 432 along with at least one set of validity parameters 433/434 that define at least one validity period corresponding to that attribute 432. The validity period 433/434 includes a set of validity parameters comprising an "EffectiveFrom" parameter 433 and an "EffectiveTo" parameter 434 to define a period of time during which the member was internal to the organization. The "EffectiveFrom" parameter 433 specifies the time of inclusion of the member in the organization, and the "EffectiveTo" parameter 434 specifies the time of termination of membership in the organization. When the member joins and subsequently departs from the organization multiple times, the table 430 for that member includes multiple sets of validity parameters (not shown), where each set of validity parameters specifies the validity period for each corresponding period spent as a member of the organization.

In yet another example of tracking changes in dynamic components, and with reference to FIG. 1, a received document includes or is associated with multiple dynamic components. A dynamic component of this document can be any attribute or parameter that changes over the life of the document (e.g., flag state, document state, etc.). As such, an embodiment generates and maintains a document record or table 120 that includes, for each document, a document identification 122 that identifies the document along with a listing of each dynamic component 124 (e.g., dynamic components of this example are "DC1," "DC2," "DCX", where "X" represents any number, but are not so limited) associated with the document and at least one set of validity parameters 126 that define at least one validity period for that dynamic component. Under this example, the validity period 126 includes the use of a set of validity parameters that include an "effective from" validity parameter 126A and an "effective to" validity parameter 126B to define a period of time corresponding to a state of the dynamic component. The "effective from" parameter 126A specifies the time the dynamic component entered a state, and the "effective to" parameter 126B specifies the time the dynamic component transitioned to a different state. When the dynamic component changes state multiple times, the document record for that document includes multiple sets (not shown) of validity parameters, with each set of validity parameters specifying the validity period for each corresponding time spent as a member of the list.

Generating and maintaining a document record of an embodiment with validity parameters corresponding to each dynamic component includes detecting a first state of the dynamic component at a start time. The dynamic component of an embodiment includes, but is not limited to, parameters like flag state, document state, and folder name, to name a few. The start time is either a time of the receiving of the document or a time of a preceding change in state occurring prior to the start time. A first set of validity parameters are generated defining a first validity period corresponding to the first state. The first validity period includes the start time along with an end time. The end time is set at the null value to indicate the dynamic component is currently remaining in the first state.

When a change associated with the dynamic component is detected, the change is identified as a change in state from the first state to a second state and, in response, the end time of the first validity parameter is reset to a time of the change in state. A second set of validity parameters are generated that define a second validity period corresponding to the second state, and the second validity period includes a start time that is the time of the change in state. The end time of the second validity period is set at the null value until such time as a subsequent change in state is detected. The process of maintaining the document record in response to detected changes in state of dynamic components repeats upon detection of all subsequent changes in state of the document content.

A more specific example of a dynamic component of a document includes the content of the document, and an embodiment uses the validity parameters to track changes in the message content. As such, an embodiment generates and maintains the document record described herein to include a record of differential changes corresponding to revisions of the document content. The differential changes are encoded in difference files that are generated each time a revised version of the document is generated. Each difference file corresponding to the document is included in the document record along with a set of validity parameters that define the validity period for that version of the document. The validity period includes the use of a set of validity parameters that include an "effective from" validity parameter and an "effective to" validity parameter to define a period of time corresponding the difference file, as described above. The "effective from" parameter specifies the time of creation of the document version corresponding to the difference file, and the "effective to" parameter specifies the time of creation of a subsequent document version. When multiple versions of the document are created, the document record for that document includes multiple difference files and sets of validity parameters, with each set of validity parameters specifying the validity period for each corresponding difference file.

An embodiment generates and maintains a document record of an embodiment that includes a dynamic component that is message or document content and corresponding validity parameters. The embodiment generates a first set of validity parameters that defines a first validity period corresponding to a first state of the message content. The first validity period includes a start time and an end time, and the document is received at the start time with the message content in the first state. The end time is set at the null value until such time as a change in state is detected. In response to detecting a change in the message content, the change is identified as a change in state from the first state to a second state, and the end time of the first validity parameter is reset to a time of the change in state. The change in state includes, but is not limited to, deletion of a portion of the message content, addition of new message content, and changes or revisions to the message content.

An embodiment generates a difference file at the end time in response to the detected state change. The difference file encodes differences in message content resulting from the change in state. A second set of validity parameters are generated to define a second validity period corresponding to the second state and the difference file is associated with the second set of validity parameters. The second validity period includes a start time that is the time of the change in state. The end time of the second validity period is set at the null value until such time as a subsequent change in state is detected. The process of generating a difference file in response to detected changes in the document repeats upon detection of any subsequent changes in state of the document content.

Figure 5:
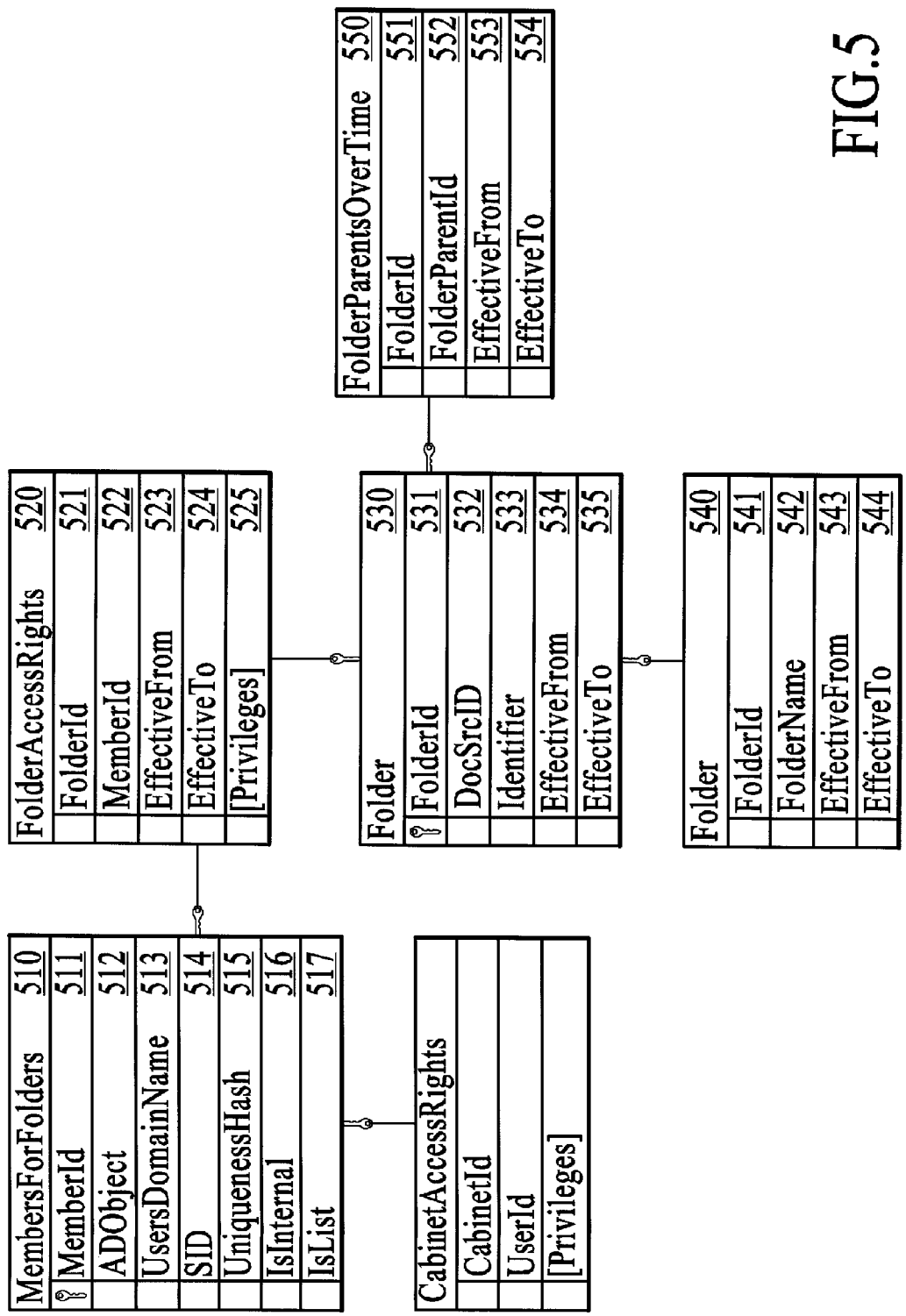
FIG. 5 shows an example database tree of tables for tracking folder attributes over time as dynamic components, under an embodiment.

A further example of modeling dynamic components of a document in a time-varying matter involves folders, and FIG. 5 shows an example database tree of tables for tracking folder attributes over time as dynamic components, under an embodiment. In this example, the document or table "MembersForFolders" 510 includes information on all members along with attributes. This table 510 can be thought of as a directory that includes information on all members of a database that have access or rights to a folder, where a member includes the likes of individuals, groups, lists of individuals, and/or lists of groups. Each member included in the table 510 corresponds to and is identified using a member identification 511 (e.g., "MemberID"). The table 510 also includes any number of attributes corresponding to a member (e.g., this example includes attribute fields "ADObject" 512 (links member to active directory information), "UsersDomain-Name" 513 (named used for display purposes), "SID" 514 (security identification know to active directory), "UniquenessHash" 515 (hash of {SenderEmail, SMTPEmail} of properties used for identifying a member), "IsInternal" 516 (identifies whether member is within or outside organization), and "IsList" 517 (identifies whether member is list or individual), but is not limited to these attributes).

The database includes a "FolderAccessRights" table 520 that tracks access rights on a folder. The folder to which a particular "FolderAccessRights" table 520 corresponds is identified using the "FolderID" field 521. The table 520 includes a record for each member included in the "MembersForFolders" table 510, to which it is linked, and the record identifies the member to which it corresponds using the "MemberID" field 522.

The dynamic component of this table 520 is a period of time each member has folder access rights. As such, the record for each member includes at least one set of validity parameters 523/524 that define at least one validity period for that member. Under this example, the validity period 523/524 includes a set of validity parameters that include an "EffectiveFrom" parameter 523 and an "EffectiveTo" parameter 524 to define a period of time during which the member had folder access rights. The "EffectiveFrom" parameter 523 specifies the time of inclusion of the member on access list, and the "EffectiveTo" parameter 524 specifies the time of termination of membership on the access list. When the member is added to and removed from the access list multiple times, the list membership record for that member includes multiple sets of validity parameters (not shown), where each set of validity parameters specifies the validity period for each corresponding period spent as a member of the access list. The table 520 also includes any number of attributes corresponding to the particular folder and member (e.g., this example includes an attribute field "Privileges" 525 (identifies privileges of the member), but is not limited to this attribute).

The database includes a "Folder" table 530 that corresponds to each folder in the database. The row identifier to which a particular "Folder" table 430 corresponds is identified using the "FolderID" field 531. The table 530 includes a "DocSrcID field 532 that is a unique identifier for a share, and an "Identifier" field 533 that is the identifier of the corresponding folder. The dynamic component of this table 530 is a period of time each folder is valid, so the record for each folder includes at least one set of validity parameters 534/535 that define at least one validity period corresponding to the folder. The validity period 534/535 includes a set of validity parameters comprising an "EffectiveFrom" parameter 534 and an "EffectiveTo" parameter 535 to define a period of time during which the folder was valid. The "EffectiveFrom" parameter 534 specifies the time at which the folder became valid, and the "EffectiveTo" parameter 535 specifies the time the folder became invalid. When a folder is made valid and subsequently becomes invalid multiple times, the table 530 for that folder includes multiple sets of validity parameters (not shown), where each set of validity parameters specifies the validity period for each corresponding period of folder validity.

The database includes a "FolderNameOverTime" table 540 that corresponds to each folder in the database. The folder to which a particular "FolderNameOverTime" table 540 corresponds is identified using the "FolderID" field 541. The folder name is specified in a "FolderName" field 542. The dynamic component of this table 530 is a period of time each folder name is valid, so the record for each folder includes at least one set of validity parameters 543/544 that define at least one validity period corresponding to the folder name. The validity period 543/544 includes a set of validity parameters comprising an "EffectiveFrom" parameter 543 and an "EffectiveTo" parameter 544 to define a period of time during which the folder name was valid. The "EffectiveFrom" parameter 543 specifies the time at which the folder name became valid, and the "EffectiveTo" parameter 544 specifies the time the folder name became invalid. When a folder name is made valid and subsequently becomes invalid multiple times, the table 540 for that folder includes multiple sets of validity parameters (not shown), where each set of validity parameters specifies the validity period for each corresponding period of folder name validity.

The database includes a "FolderParentsOverTime" table 550 that corresponds to each folder in the database. The folder to which a particular "FolderParentsOverTime" table 550 corresponds is identified using the "FolderID" field 551. The folder parent is specified in a "FolderParentID" field 552. The dynamic component of this table 550 is a period of time the identified parent folder was the parent, so the record for each folder includes at least one set of validity parameters 553/554 that define at least one validity period corresponding to the parent folder. The validity period 553/554 includes a set of validity parameters comprising an "EffectiveFrom" parameter 553 and an "EffectiveTo" parameter 554 to define a period of time during which the corresponding parent folder was the parent. The "EffectiveFrom" parameter 553 specifies the time at which the parent folder became the parent, and the "EffectiveTo" parameter 554 specifies the time at which the parent folder was removed as the parent. When a parent folder is a parent for a period and is subsequently changed from being the parent, the table 550 for that folder includes multiple sets of validity parameters (not shown), where each set of validity parameters specifies the validity period for each corresponding period of parent folder validity.

Moreover, with folders, an embodiment tracks all folders of which a message was a member using the validity parameters, as described herein. When tracking messages in folders, a table tracks each message and when it was placed in the folder and when the message was removed from the folder. The dynamic component of this table is a period of time the message was in the folder. The validity period includes a set of validity parameters comprising an "EffectiveFrom" parameter and an "EffectiveTo" parameter to define a period of time during which the corresponding message was in the folder. The "EffectiveFrom" parameter specifies the time at which the message was placed in the corresponding folder, and the "EffectiveTo" parameter specifies the time at which the message was removed from the folder. In this manner, the location of a message at any point in time can be established without creating new versions of the message for all contained messages when the containing folder is renamed or when a message is moved from one to another folder.

In the description above, numerous specific details are introduced to provide a thorough understanding of, and enabling description for, embodiments of the data storage and tracking. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the data storage and tracking is not intended to be exhaustive or to limit the systems and methods described to the precise form disclosed. While specific embodiments of, and examples for, the data storage and tracking are described herein for illustrative purposes, various equivalent modifications are possible within the scope of other systems and methods, as those skilled in the relevant art will recognize. The teachings of the data storage and tracking provided herein can be applied to other processing systems and methods, not only for the systems and methods described above.

The elements and acts of the various embodiments described above can be combined to provide further embodiments. These and other changes can be made to the data storage and tracking in light of the above detailed description.

The elements and acts of the various embodiments described above can be combined to provide further embodiments. These and other changes can be made to the embodiments described above in light of the above detailed description.

In general, in the following claims, the terms used should not be construed to limit the embodiments described above to the specific embodiments disclosed in the specification and the claims, but should be construed to include all systems that operate under the claims. Accordingly, the embodiments described above are not limited by the disclosure, but instead the scope is to be determined entirely by the claims.

While certain aspects of the embodiments described above are presented below in certain claim forms, the inventors contemplate the various aspects of the embodiments described above in any number of claim forms. Accordingly, the inventors reserve the right to add additional claims after filing the application to pursue such additional claim forms for other aspects of the embodiments described above.

What is claimed is:

1. A method running under a processor, the method comprising:

storing, in a database, a directory containing identifications of members of distribution lists, wherein the identifications of the members include identifications of individuals and groups;

storing, in the database, a table for each of the distribution lists, wherein each table includes identifications of members of the respective distribution list and dynamic components identifying a period of time during which the members are active members of the respective distribution list, and wherein the members of the respective distribution list are a subset of the members in the directory;

receiving a document and identifying a dynamic component in the document, wherein the dynamic component comprises a time-varying property that changes over time, wherein the dynamic component identified in the document comprises an identification of one of the members listed in the directory;

detecting a plurality of states of the dynamic component, wherein each state of the plurality of states corresponds to a new version of the document that results from subsequent changes to the document;

associating a set of validity parameters with each state of the plurality of states, the set of validity parameters defining a validity period for the state; and archiving the document by using the directory to archive the plurality of states and the set of validity parameters of the dynamic component into the tables that include the identification of the identified member, instead of archiving each new version of the document that corresponds to each state of the plurality of states.

2. The method of claim 1, comprising, for each state of the dynamic component, generating a set of validity parameters that includes a start time at which the state came into existence and an end time at which the state changed to a different state.

3. The method of claim 2, comprising setting the end time at a null value until such time as a state change is detected in the dynamic component, wherein the null value indicates the dynamic component is currently remaining in the state.

4. The method of claim 3, comprising:
detecting a change in the dynamic component and identifying the change as the state changing to the different state;
resetting the end time of the set of validity parameters to a time of the change in state.

5. The method of claim 4, comprising:
generating a different set of validity parameters that includes a start time at which the different state came into existence and an end time at which the different state ceased to exist;
setting the end time at a null value until such time as a state change is detected in the dynamic component, wherein the null value indicates the dynamic component is currently remaining in the different state.

6. The method of claim 1, comprising:
detecting a first state of the dynamic component at a start time, wherein the start time is at least one of a time of the receiving of the document and a time of a preceding change in state occurring prior to the start time;
generating a first set of validity parameters that defines a first validity period corresponding to the first state, wherein the first validity period includes the start time and an end time;
setting the end time at a null value, wherein the null value indicates the dynamic component is currently remaining in the first state.

7. The method of claim 6, comprising:
detecting a change in the dynamic component;
identifying the change as a change in state from the first state to a second state;
resetting the end time of the first validity parameter to a time of the change in state.

8. The method of claim 7, comprising generating a second set of validity parameters that defines a second validity period corresponding to the second state, wherein the second validity period includes a start time that is the time of the change in state.

9. The method of claim 8, comprising setting the end time of the second validity period at a null value until such time as a subsequent change in state is detected, wherein the null value indicates the dynamic component is remaining in the second state.

10. The method of claim 6, wherein the dynamic component comprises at least one of flag state, document state, and folder name.

11. The method of claim 1, wherein the document is a list and the dynamic component is an element of the list.

12. The method of claim 11, comprising generating a first set of validity parameters that defines a first validity period corresponding to a first state of the element, wherein the first validity period includes a start time and an end time, wherein the document when received at the start time comprises the element in the first state.

13. The method of claim 12, comprising setting the end time at a null value until such time as a change in state is detected, wherein the null value indicates the element is remaining in the first state.

14. The method of claim 12, comprising:
detecting a change in the element;
identifying the change as a change in state from the first state to a second state;
resetting the end time of the first validity parameter to a time of the change in state.

15. The method of claim 14, comprising generating a second set of validity parameters that defines a second validity period corresponding to the second state, wherein the second validity period includes a start time that is the time of the change in state.

16. The method of claim 15, comprising setting the end time of the second validity period at a null value until such time as a subsequent change in state is detected, wherein the null value indicates the element is remaining in the second state.

17. The method of claim 11, wherein the change in state comprises at least one of adding the element to the list, removing the element from the list, and revising the element on the list.

18. The method of claim 11, wherein the list comprises at least one of a list having membership changes over time, an electronic mail distribution list, a security access list, a user group list, and an access rights list.

19. The method of claim 11, wherein the archiving of the plurality of states and the set of validity parameters replaces use of at least one of expanded lists and nested lists corresponding to the each new version.

20. The method of claim 1, wherein the document comprises an electronic message and the dynamic component is message content.

21. The method of claim 20, comprising generating a first set of validity parameters that defines a first validity period corresponding to a first state of the message content, wherein the first validity period includes a start time and an end time, wherein the document when received at the start time comprises the message content in the first state.

22. The method of claim 21, comprising setting the end time at a null value until such time as a change in state is detected, wherein the null value indicates the message content is remaining in the first state.

23. The method of claim 21, comprising:
detecting a change in the message content;
identifying the change as a change in state from the first state to a second state;
resetting the end time of the first validity parameter to a time of the change in state.

24. The method of claim 23, wherein the change in state comprises at least one of deleting a portion of the message content, adding additional message content, and changing the message content.

25. The method of claim 23, comprising generating a difference file at the end time, the difference file coding differences in the message content resulting from the change in state.

26. The method of claim 25, comprising:
generating a second set of validity parameters that defines a second validity period corresponding to the second state, wherein the second validity period includes a start time that is the time of the change in state;
associating the difference file with the second set of validity parameters.

27. The method of claim 26, comprising setting the end time of the second validity period at a null value until such time as a subsequent change in state is detected, wherein the null value indicates the dynamic component is remaining in the second state.

28. The method of claim 1, comprising determining a state of the document at any point in time during life of the document using only the document, the plurality of states, and sets of validity parameters corresponding to each of the plurality of states.

29. A method running under a processor, the method comprising:
- storing, in a database, a directory containing identifications of members of distribution lists, wherein the identifications of the members include identifications of individuals and groups;
- storing, in the database, a table for each of the distribution lists, wherein each table includes identifications of members of the respective distribution list and dynamic components identifying a period of time during which the members are active members of the respective distribution list, and wherein the members of the respective distribution list are a subset of the members in the directory;
- identifying a dynamic component in a document that comprises a time-varying property, wherein the dynamic component identified in the document comprises an identification of one of the members listed in the directory;
- detecting a plurality of states of the dynamic component, wherein each state of the plurality of states corresponds to a new version of the document resulting from changes;
- for each state, generating a set of validity parameters that includes a start time at which the state came into existence and an end time at which the state changed to a different state; and
- archiving the document by using the directory to archive the plurality of states and the set of validity parameters of the dynamic component into the tables in the database that include the identification of the identified member, instead of archiving each new version of the document.

30. A system comprising:
- a processor coupled to a database; and
- a memory storing an archiving program which when executed causes the processor to:
  - store, in the database, a directory containing identifications of members of distribution lists, wherein the identifications of the members include identifications of individuals and groups;
  - store, in the database, a table for each of the distribution lists, wherein each table includes identifications of members of the respective distribution list and dynamic components identifying a period of time during which the members are active members of the respective distribution list, and wherein the members of the respective distribution list are a subset of the members in the directory;
  - receive a document and identify a dynamic component in the document, wherein the dynamic component comprises a time-varying property that changes over time, wherein the dynamic component identified in the document comprises an identification of one of the members listed in the directory;
  - detect a plurality of states of the dynamic component, wherein each state of the plurality of states corresponds to a new version of the document that results from subsequent changes to the document;
  - associate a set of validity parameters with each state of the plurality of states, the set of validity parameters defining a validity period for the state; and
  - archive the document by using the directory to archive the plurality of states and the set of validity parameters of the dynamic component into the tables that include the identification of the identified member, instead of archiving each new version of the document that corresponds to each state of the plurality of states.

31. The system of claim 30, wherein the archiving program further causes the processor to, for each state of the dynamic component, generate a set of validity parameters that includes a start time at which the state came into existence and an end time at which the state changed to a different state.

32. The system of claim 31, wherein the archiving program further causes the processor to set the end time at a null value until such time as a state change is detected in the dynamic component, wherein the null value indicates the dynamic component is currently remaining in the state.

33. The system of claim 32, wherein the archiving program further causes the processor to detect a change in the dynamic component and identify the change as the state changing to the different state and reset the end time of the set of validity parameters to a time of the change in state.

34. The system of claim 33, wherein the archiving program further causes the processor to:
- generate a different set of validity parameters that includes a start time at which the different state came into existence and an end time at which the different state ceased to exist; and
- set the end time at a null value until such time as a state change is detected in the dynamic component, wherein the null value indicates the dynamic component is currently remaining in the different state.

35. The system of claim 30, wherein the dynamic component comprises at least one of flag state, document state, and folder name.

36. The system of claim 30, wherein the document is a list and the dynamic component is an element of the list, wherein the list comprises at least one of a list having membership changes over time, an electronic mail distribution list, a security access list, a user group list, and an access rights list.

37. The system of claim 30, wherein the document comprises an electronic message and the dynamic component is message content.

38. The system of claim 37, wherein the archiving program further causes the processor to:
- detect a change in the message content;
- identify the change as a change in state; and
- generate a difference file corresponding to the change in state, the difference file coding differences in the message content resulting from the change in state; associating a set of validity parameters with the difference file.

39. The system of claim 38, wherein the change in state comprises at least one of deleting a portion of the message content, adding additional message content, and changing the message content.

40. The system of claim 30, wherein the archive program further causes the processor to determine a state of the document at any point in time during life of the document using only the document, the plurality of states, and sets of validity parameters corresponding to each of the plurality of states.

* * * * *